US012763421B2

(12) United States Patent
Hirano et al.

(10) Patent No.: US 12,763,421 B2
(45) Date of Patent: Oct. 13, 2026

(54) ELECTRICAL STORAGE MODULE

(71) Applicant: Panasonic Intellectual Property Management Co., Ltd., Osaka (JP)

(72) Inventors: Tatsuya Hirano, Osaka (JP); Hiroshi Takasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 881 days.

(21) Appl. No.: 17/904,186

(22) PCT Filed: Feb. 25, 2021

(86) PCT No.: PCT/JP2021/007187
§ 371 (c)(1),
(2) Date: Aug. 12, 2022

(87) PCT Pub. No.: WO2021/172465
PCT Pub. Date: Sep. 2, 2021

(65) Prior Publication Data

US 2023/0068533 A1 Mar. 2, 2023

(30) Foreign Application Priority Data

Feb. 28, 2020 (JP) ................................ 2020-034290

(51) Int. Cl.
*H01M 50/289* (2021.01)
*H01G 11/10* (2013.01)
(Continued)

(52) U.S. Cl.
CPC .......... *H01M 50/289* (2021.01); *H01G 11/10* (2013.01); *H01G 11/80* (2013.01);
(Continued)

(58) Field of Classification Search
None
See application file for complete search history.

(56) References Cited

U.S. PATENT DOCUMENTS

| | | | |
|---|---|---|---|
| 6,379,837 | B1 | 4/2002 | Takahashi et al. |
| 2016/0118633 | A1 | 4/2016 | Hongo et al. |

(Continued)

FOREIGN PATENT DOCUMENTS

| | | | |
|---|---|---|---|
| CN | 105552264 | A | 5/2016 |
| CN | 105633313 | A | 6/2016 |

(Continued)

OTHER PUBLICATIONS

Machine translation of JP2013196810 (Year: 2013).*
(Continued)

*Primary Examiner* — Wyatt P Mcconnell
(74) *Attorney, Agent, or Firm* — WHDA, LLP

(57) ABSTRACT

An electrical storage module includes electrical storage devices and a holder including housing parts housing the electrical storage devices therein. Each electrical storage device has an outer circumferential surface, a first end surface provided at a first end of the outer circumferential surface, and a second end surface which is provided at a second end of the outer circumferential surface and is opposite to the first end in a first direction. An inner circumferential surface of the housing part faces the outer circumferential surface of the electrical storage device. The inner circumferential surface includes a sealing member pressing the outer circumferential surface. A resin member is housed in a space demarcated by the inner circumferential surface of the housing part, the outer circumferential surface of the electrical storage device, and the sealing member.

20 Claims, 18 Drawing Sheets

(51) Int. Cl.

| | |
|---|---|
| ***H01G 11/80*** | (2013.01) |
| ***H01M 10/0525*** | (2010.01) |
| ***H01M 50/213*** | (2021.01) |
| ***H01M 50/249*** | (2021.01) |
| ***H01M 50/502*** | (2021.01) |

(52) U.S. Cl.
CPC ..... *H01M 10/0525* (2013.01); *H01M 50/213* (2021.01); *H01M 50/249* (2021.01); *H01M 50/502* (2021.01); *H01M 2220/20* (2013.01)

(56) References Cited

U.S. PATENT DOCUMENTS

| | | | | |
|---|---|---|---|---|
| 2016/0149175 | A1* | 5/2016 | Morimitsu .......... | H01M 50/213 429/156 |
| 2018/0366701 | A1 | 12/2018 | Morimitsu et al. | |

FOREIGN PATENT DOCUMENTS

| | | | |
|---|---|---|---|
| JP | 2013196810 | * | 9/2013 |
| JP | 2014-229725 | | 12/2014 |
| JP | 2016-085914 | | 5/2016 |
| JP | 2016-100255 | | 5/2016 |
| JP | 2017-027736 | | 2/2017 |
| JP | 2019-008887 | | 1/2019 |

OTHER PUBLICATIONS

English Translation of Chinese Office Action dated Feb. 28, 2024 for the related Chinese Patent Application No. 202180007159.4.
International Search Report of PCT application No. PCT/JP2021/007187 dated Apr. 20, 2021.

* cited by examiner

ELECTRICAL STORAGE MODULE

TECHNICAL FIELD

The present disclosure relates to an electrical storage module.

BACKGROUND ART

An electrical storage module includes a holder made of resin or the like for fixing or holding electrical storage devices. In the electrical storage module including electrical storage devices, it is important to reduce weight and volume of an entire electrical storage module and to improve an energy density of the electrical storage module.

PTL 1 proposes an assembled battery including cylindrical batteries, a holder, and adhesive bodies. The holder has a plate shape having a first surface and a second surface that is a back surface of the first surface, and has battery through-holes extending in a thickness direction. The holder includes a holder part holding outer circumferential surfaces of the cylindrical batteries inserted in the battery through-holes, respectively. The adhesive bodies include adhesive cured between the outer circumferential surfaces of the cylindrical batteries and inner circumferential surfaces of the battery through-holes of the holder part, and bond the outer circumferential surfaces of the cylindrical batteries to the inner circumferential surfaces of the holder part to each other. All the inner circumferential surfaces of the battery through-holes of the holder part include: posture restricting portions restricting ranges of postures taken by the cylindrical batteries inserted in the battery through-holes; departing portions depart from the outer circumferential surfaces of the cylindrical batteries around whole circumferences even when the cylindrical batteries take any posture in the range of the postures restricted by the posture restricting portions; and liquid-injection grooves extending from the second surfaces to the departing portions. All of the adhesive bodies include whole-circumferential bonded portions made of hardened adhesive bonding at least the departing portions of the inner circumferential surfaces of the holder part to departing-portion opposing portions of the outer circumferential surfaces of the cylindrical batteries, opposing the departing portions, around the whole circumferences of the cylindrical batteries.

CITATION LIST

Patent Literature

PTL 1: Japanese Patent Laid-Open Publication No. 2019-8887

SUMMARY OF THE INVENTION

Technical Problem

In the proposal of PTL 1, since the adhesive passes through between outer circumferential surface 23S of a battery and posture restricting portion 27Sr of the inner circumferential surface of battery through-holes (see FIG. 7 of PTL 1), it is difficult to manage the application state of an adhesive.

Solution to Problem

One aspect of the present disclosure relates to an electrical storage module including electrical storage devices and a holder including housing parts housing the electrical storage devices therein. Each electrical storage device has an outer circumferential surface, a first end surface provided at a first end of the outer circumferential surface, and a second end surface which is provided at a second end of the outer circumferential surface and is opposite to the first end in a first direction. An inner circumferential surface of the housing part faces the outer circumferential surface of the electrical storage device. The inner circumferential surface includes a sealing member pressing the outer circumferential surface. A resin member is housed in a space demarcated by the inner circumferential surface of the housing part, the outer circumferential surface of the electrical storage device, and the sealing member.

Advantageous Effect of Invention

According to the present disclosure, the sealing member suppresses expansion of the resin member such as an adhesive applied to an air-gap between the housing part of the holder and an electrical storage device. The present disclosure thus provides an electrical storage module capable of easily managing an application state of the resin member in the air-gap.

DESCRIPTION OF EMBODIMENTS

Figure 1:
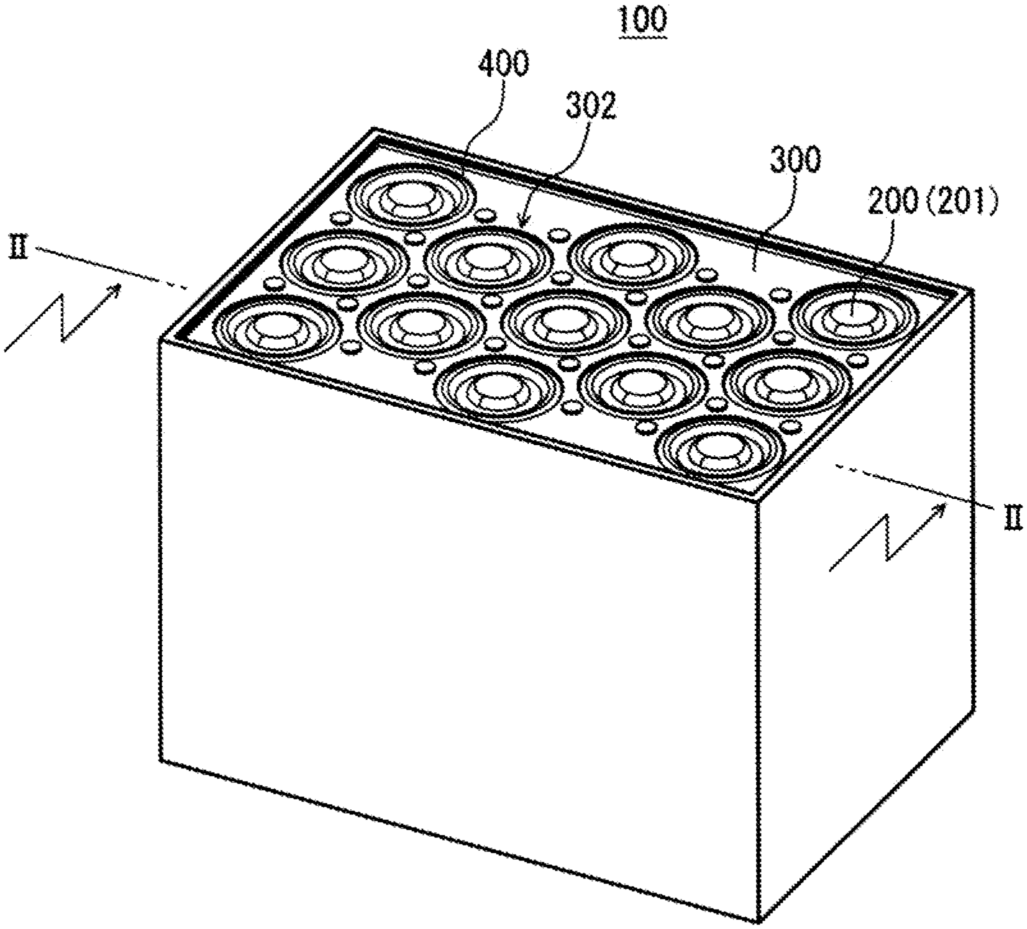
FIG. 1 is a perspective view of an electrical storage module in accordance with an exemplary embodiment of the present disclosure.

An electrical storage module according to one aspect of the present disclosure includes plural electrical storage devices and a holder including plural housing parts. Each of the housing parts houses a corresponding one of the electrical storage devices therein. The electrical storage device has an outer circumferential surface, a first end surface which is provided at a first end of the outer circumferential surface, and a second end surface which is provided at a second end of the outer circumferential surface and is opposite to the first end in a first direction. An inner circumferential surface of the housing part faces the outer circumferential surface of the electrical storage device. The inner circumferential surface includes a sealing member pressing the outer circumferential surface. A resin member is housed in a space demarcated by the inner circumferential surface of the housing part, the outer circumferential surface of the electrical storage device, and the sealing member. The sealing member prevents a liquid resin member before cured and injected into a sealing space from leaking from the sealing space. Therefore, management of an application state of the resin member becomes easy. The application state of the resin member includes, for example, an application amount or an applied area.

The first direction means a height direction or an axial direction of the electrical storage device in which the first end surface is located opposite to the second end surface.

When a resin member is housed in a space (hereinafter, also referred to as "sealing space") demarcated by the inner circumferential surface of the housing part, the outer circumferential surface of the electrical storage device, and the sealing member, the electrical storage device can be fixed to the inner circumferential surface of the housing part at the outer circumferential surface. That is, in the height direction of the electrical storage device, a member for restricting displacement of the first end surface or the second end surface of the electrical storage device is not required to be provided in the housing part of the holder. Since the member for restricting the displacement in the height direction of the electrical storage device is not provided, the height of the housing part can be reduced, and an energy density of the electrical storage module can be easily increased. However, the electrical storage module of the present disclosure may include a member for restricting the displacement in the height direction mentioned above. The holder may be made of resin, but may contain metal as long as electrical insulation between the electrical storage devices is maintained.

The resin member is a member including an adhesive, a sealant, a sealing material, and the like, and has adhesiveness for at least fixing the outer circumferential surface of the electrical storage device to the inner circumferential surface of the housing part of the holder. As the resin member, for example, an epoxy thermosetting adhesive may be used. The resin member has fluidity during injection into the sealing space, and the resin member is cured and becomes solid when a predetermined time elapses after injection into the sealing space. However, the resin member after being cured may have predetermined viscosity or may have elasticity. The resin member may be heated during curing.

The holder of the housing part may have a through-hole therein extending in the first direction. The outer circumferential surface of the electrical storage device inserted into the through-hole is pressed by the annular sealing member provided on the inner circumferential surface of the housing part. At this moment, a positional relation between the electrical storage device and the holder is temporarily determined by a reaction force acting on between the inner circumferential surface and the outer circumferential surface. After that, a liquid resin member is injected into the sealing space from a first end surface side or a second end surface side of the electrical storage device. The sealing member can press the outer peripheral surface when the sealing member contacts the outer peripheral surface in an elastically deformed state such as compression or deflection. The sealing member and the holder may be made of the same material, or different materials. When the sealing member and the holder are made of different resins, the resins may be molded by two-color molding, and the like.

At least a portion of the peripheral edge in the first end surface may be exposed from the holder when the module is viewed from the first end surface along the first direction. Since the housing part of the holder does not require a member for supporting the first end surface of the electrical storage device, the housing part may not necessarily include a portion to be engaged into the peripheral edge of the first end surface. In the case where such an engagement portion is not provided, at least a portion of the peripheral edge in the first end surface is not shielded by the holder. The entire peripheral edge in the first end surface may be exposed without being shielded by the holder when the module is viewed from the first end surface along the first direction.

At least a portion of the peripheral edge in the first end surface may be exposed from the holder when the module is viewed from the second end surface along the first direction. Since the housing part of the holder does not require a member for supporting the second end surface of the electrical storage device, the housing part may not necessarily include a portion to be engaged into the peripheral edge of the second end surface. In the case where such an engagement portion is not provided, at least a portion of the peripheral edge in the second end surface is not shielded by the holder. The entire peripheral edge in the second end surface may be exposed without being shielded by the holder, when the module is viewed from the second end surface along the first direction.

Plural sealing members may be arranged along the first direction provided on the inner circumferential surface of the housing part. The plural sealing members allows the application state of the resin member to be managed more strictly. For example, even if some of the sealing members are damaged, a remaining sealing member demarcates a sealing space.

The sealing member may have a tubular shape covering therein a portion of the outer circumferential surface of the electrical storage device. Such a tubular sealing member enlarges an area of the electrical storage device that is in surface contact with the outer circumferential surfaces, and enhances an effect of positioning the electrical storage device in the housing part and an effect of limiting the volume within a predetermined volume. Therefore, it becomes less likely that the resin member leaks out from a sealing space.

The holder may include plural components communicating with one another in the first direction. For example, the holder may include a first holder component and a second holder component communicating with each other in the first direction. The first holder component includes a first housing portion housing a portion of the electrical storage device including the first end surface. The second holder component includes a second housing portion housing a portion of the electrical storage device including the second end surface. A portion of the inner circumferential surface of the housing part assigned to the first housing portion is provided with a first sealing member as a sealing member. In this case, the resin member is housed in a first space demarcated by the portion of the inner circumferential surface of the housing part assigned to the first housing portion, the outer circumferential surface of the electrical storage device, and the sealing member. That is to say, the first space constitutes at least a portion of the sealing space. In the case that the housing part includes the first sealing member, the first space constitutes the entire sealing space.

A portion of the inner circumferential surface of the housing part assigned to the second housing portion is further provided with a second sealing member as the sealing member. In this case, the resin member is further housed in a second space demarcated by the portion of the inner circumferential surface of the housing part assigned to the second housing portion, the outer circumferential surface of the electrical storage device, and the sealing member. The second space constitutes a portion of the sealing space. In the case that the housing part includes only the first sealing member and second sealing member, the first and second spaces constitute the entire sealing space.

The first space may be a space extending from the first sealing member toward the first end surface. Furthermore, the second space may be a space extending from the second sealing member toward the second end surface. In this case, the end portion at the first end surface side and the end portion at the second end surface side of the outer circumferential surface of the electrical storage device can be bonded to the inner circumferential surface of the housing part with the resin members, respectively. As a result, the strength of the electrical storage module can be improved.

In order to produce an electrical storage module including the second space extending from the second sealing member toward the second end surface, firstly, a portion of the electrical storage device including the first end surface is housed in the first housing portion of the first holder component, then, the first end surface is disposed in the upper side in the vertical direction and the second end surface is disposed in the lower side in the vertical direction. A liquid resin member fills the first space and is cured. After that, a portion of electrical storage device including the second end surface is housed in the second housing portion of the second holder component, and the direction of the electrical storage device is reversed, the second end surface is disposed in the upper side in the vertical direction, and the first end surface is disposed at the lower side in the vertical direction. Then, a liquid resin member fills the second space and is cured.

The second space may be a space extending from the second sealing member toward the first end surface. In this case, the end portion at the first end surface side, and a vicinity of the boundary between the first holder component of the outer circumferential surfaces and the second holder component can be bonded to the inner circumferential surface of the housing part with the resin member, respectively. Also in this case, the strength of the electrical storage module can be improved.

In order to produce an electrical storage module including the second space extending from the second sealing member toward the first end surface, firstly, a portion of the electrical storage device including the second end surface is housed in the second housing portion of the second holder component, then, the second end surface is disposed in the upper side in the vertical direction and the second end surface is disposed in the lower side in the vertical direction, and a liquid resin member fills the second space and is cured. After that, a portion of electrical storage device including the first end surface is housed in the first housing portion of the first holder component, and the first end surface is disposed in the upper side in the vertical direction, and the second end surface is disposed at the lower side in the vertical direction. Then, a liquid resin member fills the second space and is cured.

The electrical storage module may include a collector with a plate shape electrically connected to the electrical storage devices. The end surface of the holder has an opening of the housing part. The resin member may extend not only to the sealing space, but also to the end surface of the holder through the opening of the housing part from the sealing space. In this case, the collector may contact the end surface of the holder via the resin member (more specifically, a resin member covering at least a portion of the end surface of the holder). This configuration allows the collector to be bonded to the holder.

The electrical storage device includes, for example, a case having an opening, an electrode body housed in the case and including a first electrode and a second electrode, and a sealing member sealing the opening of the case. The case includes, for example, a tubular portion, an opening end portion corresponding to an opening formed at one end of the tubular portion, and a bottom portion closing another end portion of the tubular portion. In this case, the first end surface includes an outer surface of the sealing member, and the second end surface includes the outer surface of the bottom portion. The shape of the case may be, for example, a cylindrical shape, but the shape is not particularly limited to.

The outer circumferential surface of the electrical storage device pressed by sealing member may be an outer circumferential surface of the tubular portion, or an outer circumferential surface of the opening end of the tubular portion. The outer diameter of the tubular portion is preferably the same as the outer diameter of the opening end portion or larger than the outer diameter of the opening end portion. An annular groove may be formed in the boundary between the opening end portion and the tubular portion. In this case, the sealing member may be engaged within a groove portion. Furthermore, a portion to the case opening side from the groove portion (or a boundary portion between the groove portion and the opening end) is pressed by the sealing member.

In the above-mentioned configuration, since flowing of resin member 400 toward a second end portion side in the sealing space S is restricted by sealing member 301, the application state of resin member 400 is easily managed. Furthermore, intrusion of resin member 400 into groove portion 210G is suppressed.

The electrode body includes a first electrode having a first polarity, a second electrode having a second polarity, and a separator between the electrodes. In a cylindrical electrical storage device 200, the first electrode and the second electrode are wound with the separator between the electrodes to form a columnar electrode body. The first electrode is electrically connected to sealing member 230, and the second electrode is electrically connected to case 210. That is, sealing member 230 has the same polarity as that of the first electrode, and case 210 has the same polarity as that of the second electrode.

The plurality of electrical storage devices may be arranged side by side. Arrangement side by side of plurality electrical storage devices means that, for example, the axial directions of the electrode bodies of the plurality of electrical storage devices are substantially in parallel to each other, first and second end portions of an aggregate of the plural electrical storage devices are positioned in substantially the same plane, and tubular portions of the cases of the electrical storage devices are arranged so as to be adjacent to each other. The electrical storage devices may be arranged so as to be directed in the same direction as the case. In this case, the sealing members of the electrical storage devices are positioned substantially on the same plane.

The electrical storage module may include a first collector as the collector with the plate shape. The first collector has the same polarity as that of one of the electrical storage devices. Furthermore, the electrical storage module may include a second collector having the same polarity as the polarity of the other electrical storage device. When the cases of the electrical storage devices are arranged to be directed in the same direction, both the first collector and the second collector are easily positioned collectively to the first end surface side of electrical storage device (specifically, a side having the sealing member). In such a case, a collector structure is not necessarily required to be provided at the second end surface side of electrical storage device (specifically, a bottom portion sider). Therefore, it is possible to further reduce a space which the electrical storage device needs in the axial direction.

The electrode body includes, for example, a first electrode and a second electrode which are wound with a separator between the electrodes. In the case that the electrical storage device is a battery, one of the first electrode and the second electrode is a positive electrode and the other is a negative electrode. Furthermore, one of the first collector and the second collector is a positive electrode collector, and the other is a negative electrode collector.

The types of the electrical storage devices are not particularly limited to, but examples thereof include a primary battery, a secondary battery, a lithium ion capacitor, an electric double layer capacitor, a solid electrolytic capacitor, and the like. Among them, non-aqueous electrolyte secondary batteries such as a lithium-ion secondary battery having high energy density (including all solid-state battery) can be suitably used.

Hereinafter, an electrical storage module in accordance with the exemplary embodiment of the present invention will be described with reference to drawings, but the present invention is not limited to the following description.

Figure 2:
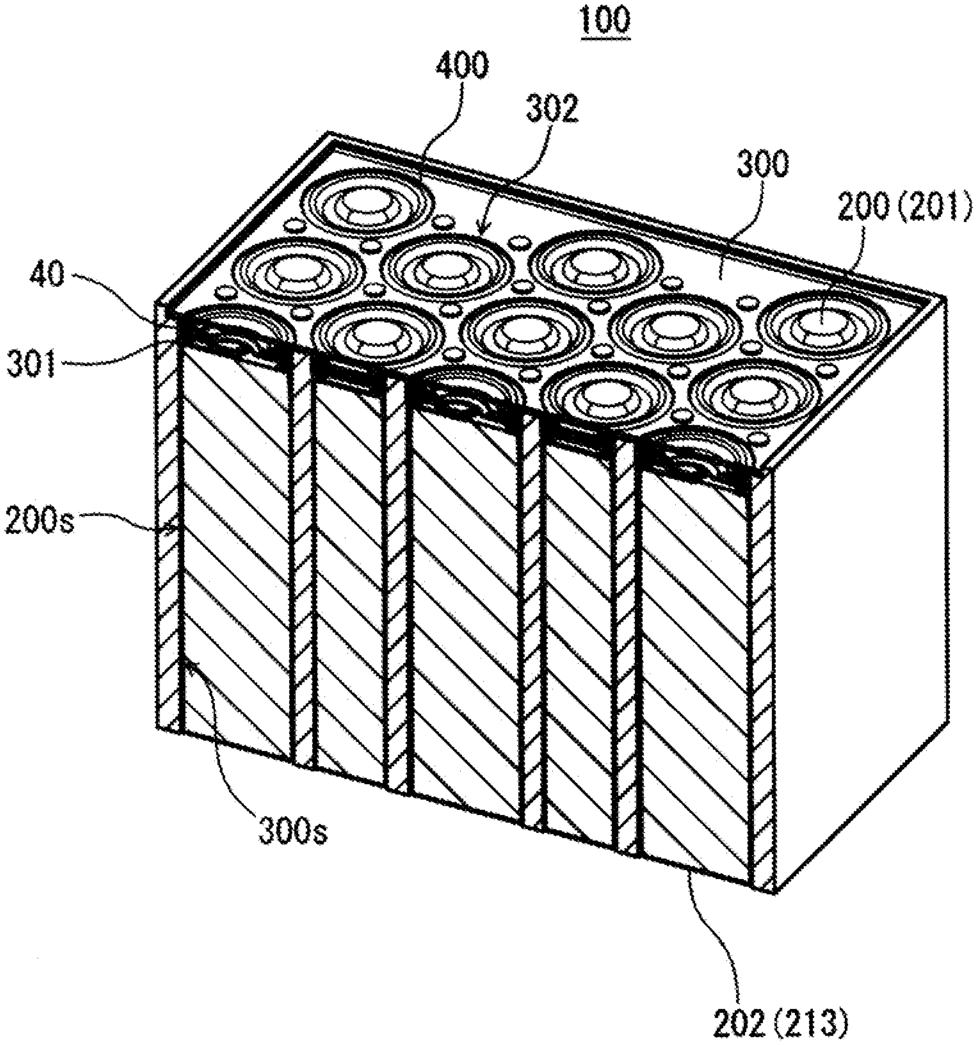
FIG. 2 is a sectional view of an electrical storage device taken on line II-II shown in FIG. 1.
Figure 3A:
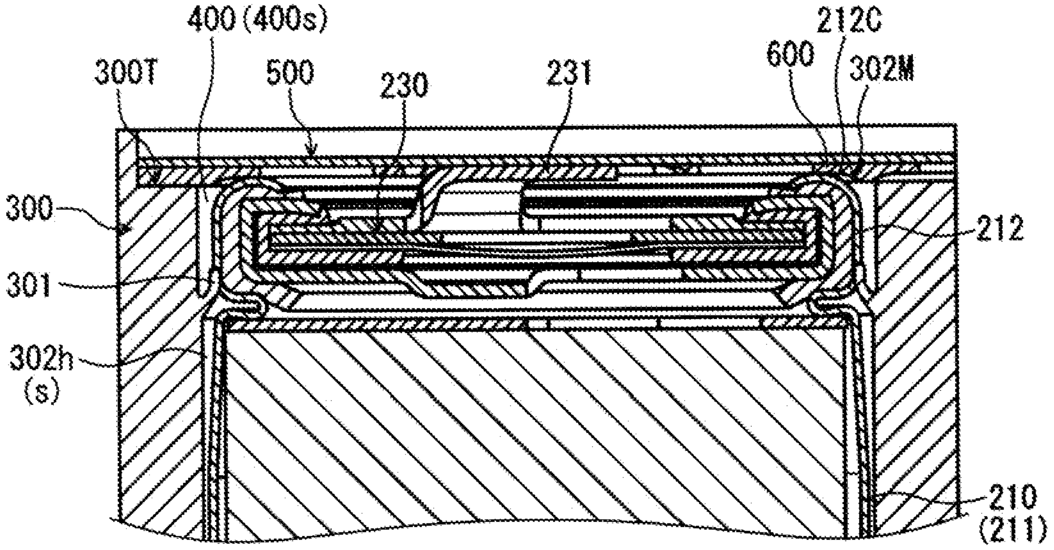
FIG. 3A is an enlarged view of a principal part of the device shown in FIG. 2.
Figure 3B:
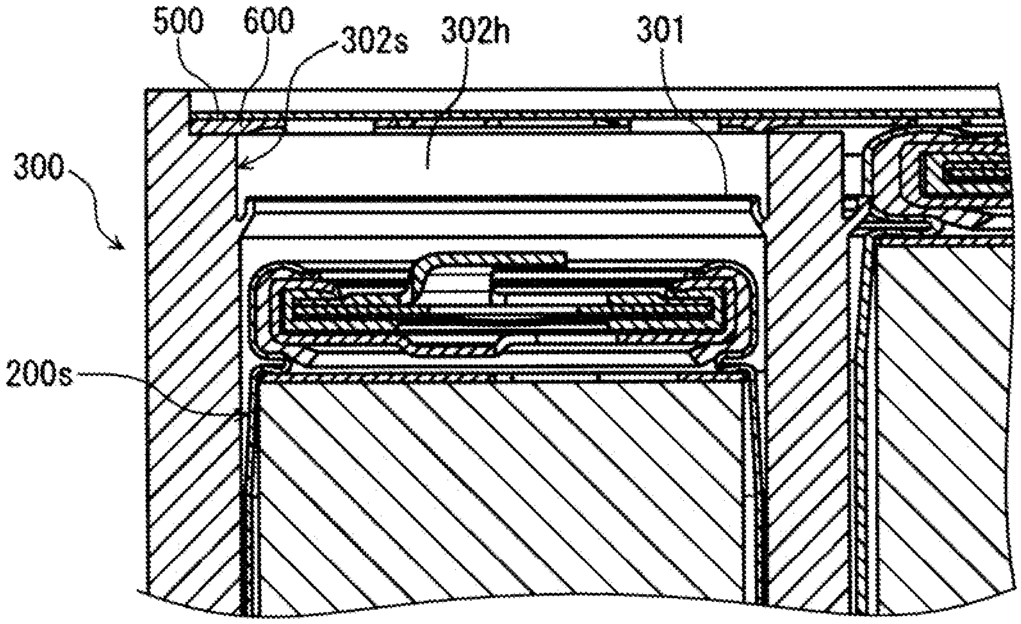
FIG. 3B illustrates the module shown in FIG. 3A for illustrating a state immediately before an electrical storage device is completely housed in a housing part.
Figure 4:
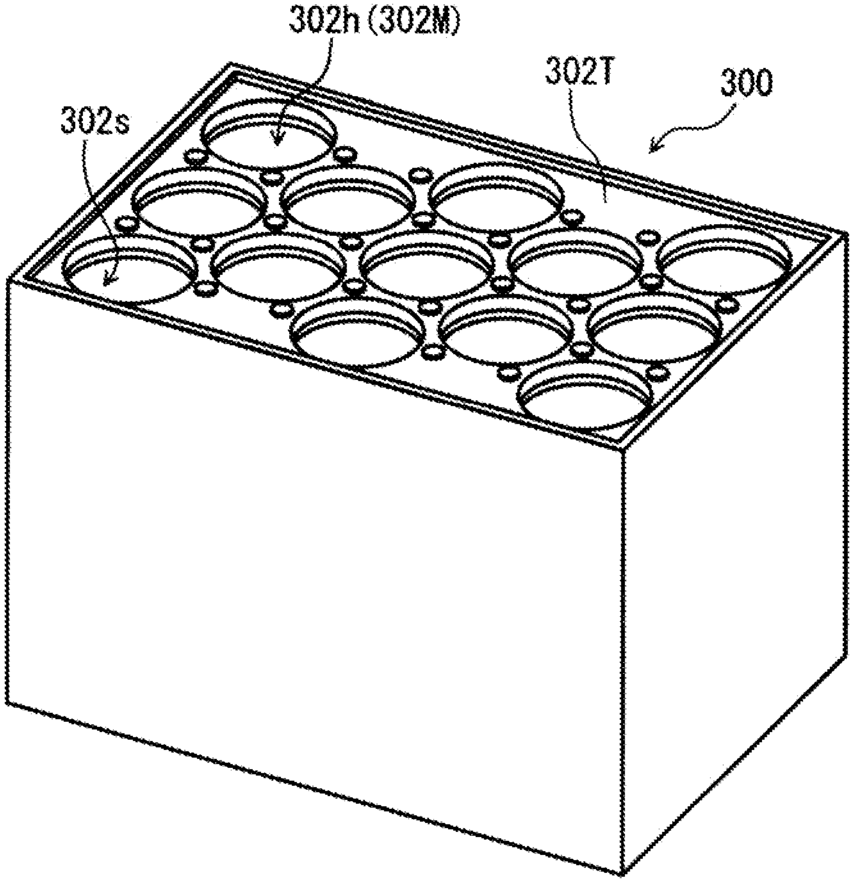
FIG. 4 is a perspective view of a holder.
Figure 5A:
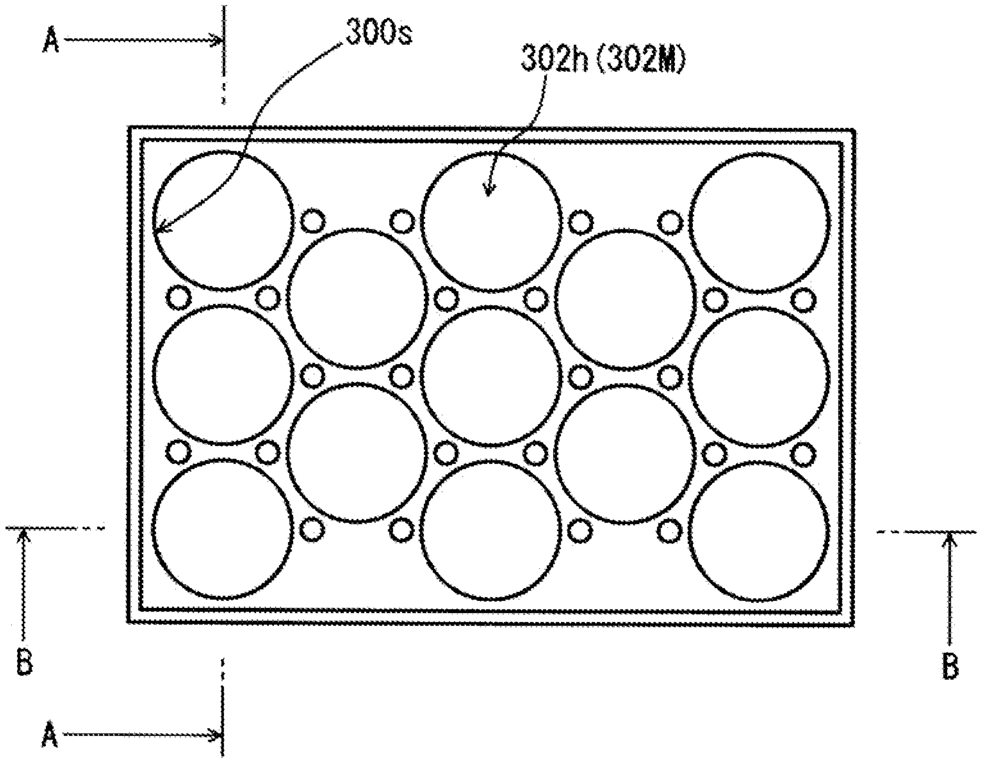
FIG. 5A is a plan view of the holder shown in FIG. 4.
Figure 5B:
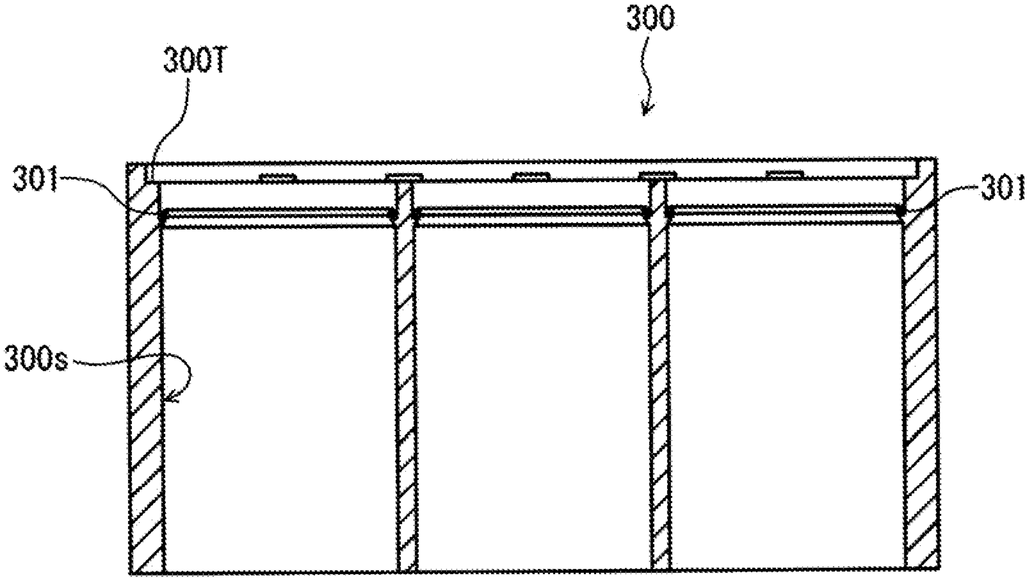
FIG. 5B is a partial sectional view of the holder taken along n line A-A shown in FIG. 4.
Figure 5C:
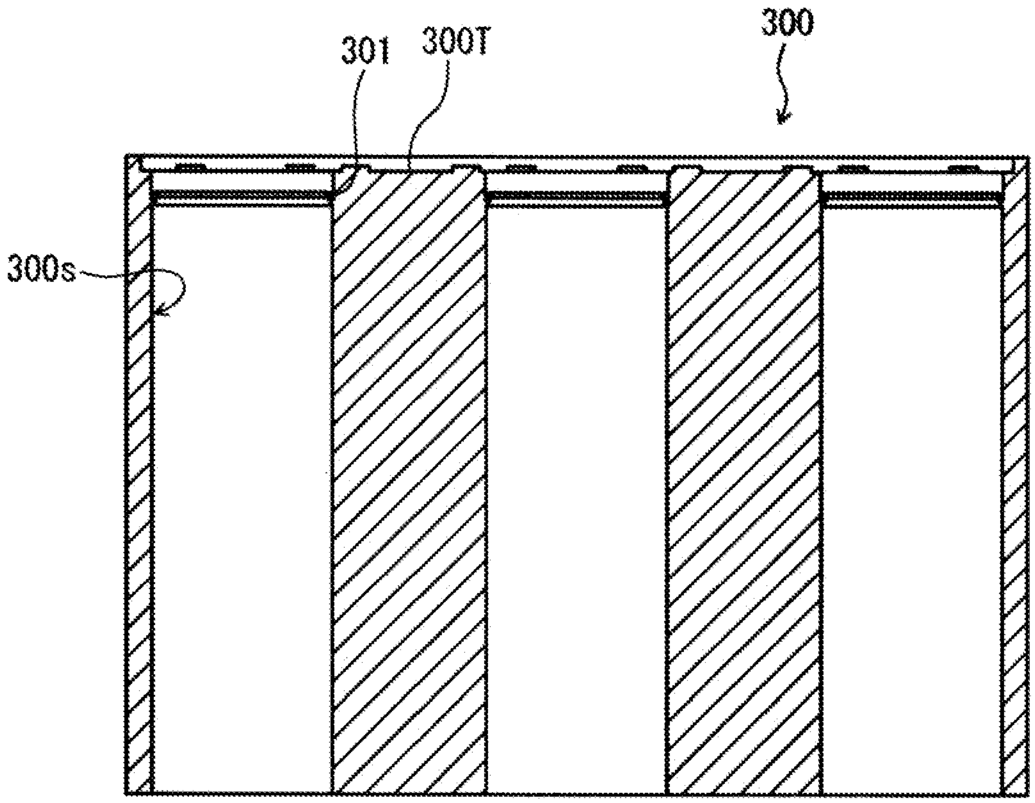
FIG. 5C is a sectional view of the holder taken along line B-B shown in FIG. 5A.
Figure 6A:
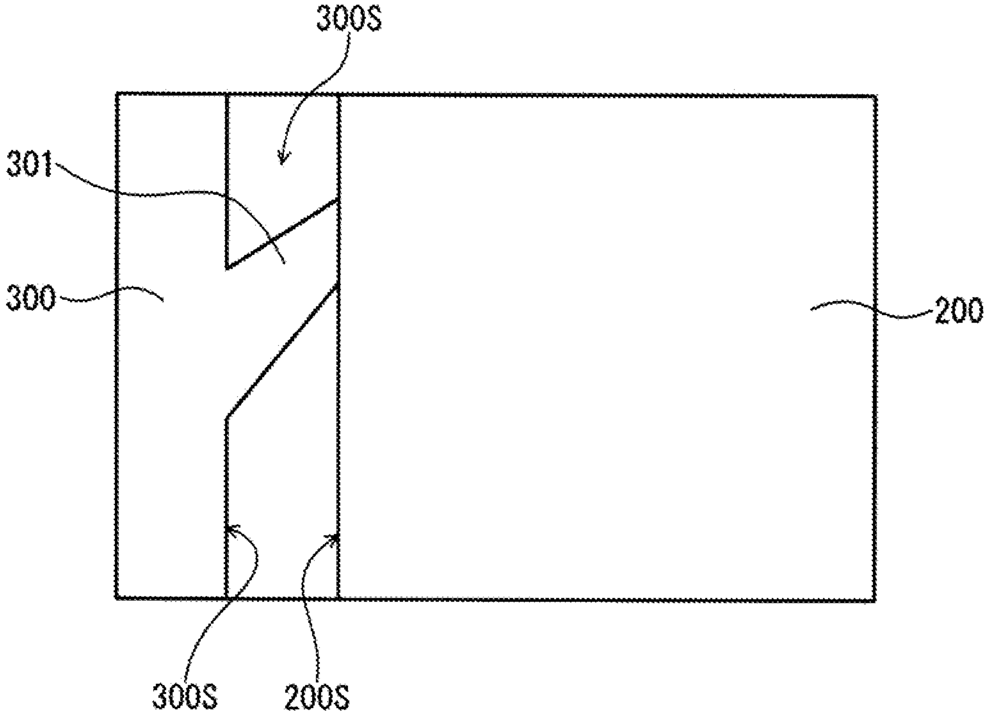
FIG. 6A illustrates a first modified example of a sealing member.
Figure 6B:
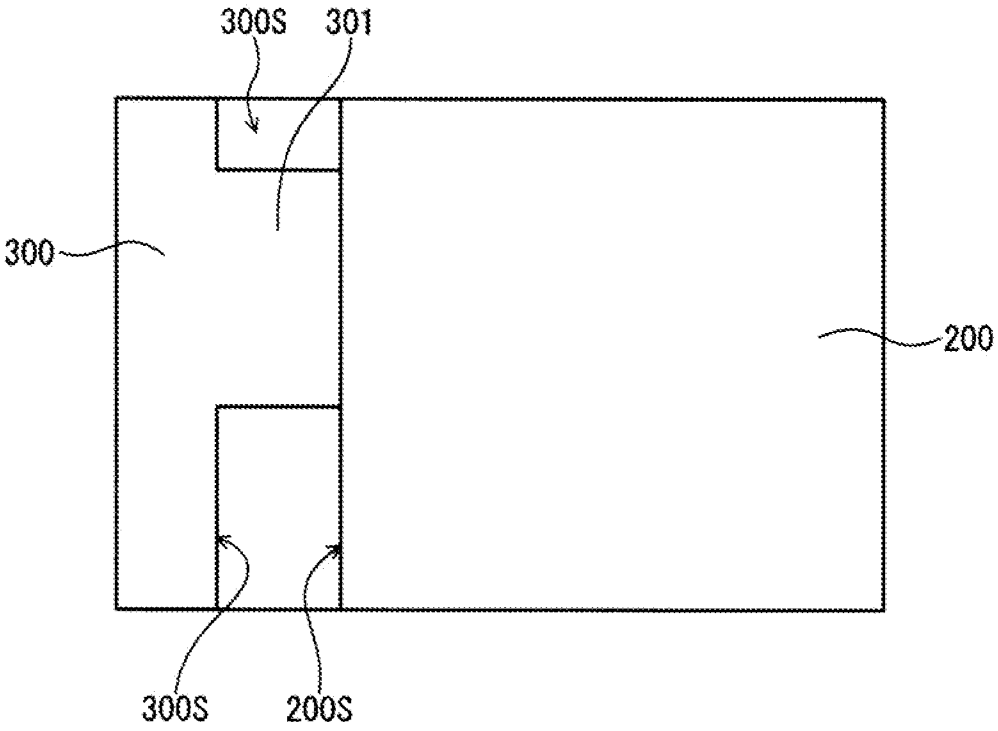
FIG. 6B illustrates a second modified example of the sealing member.
Figure 6C:
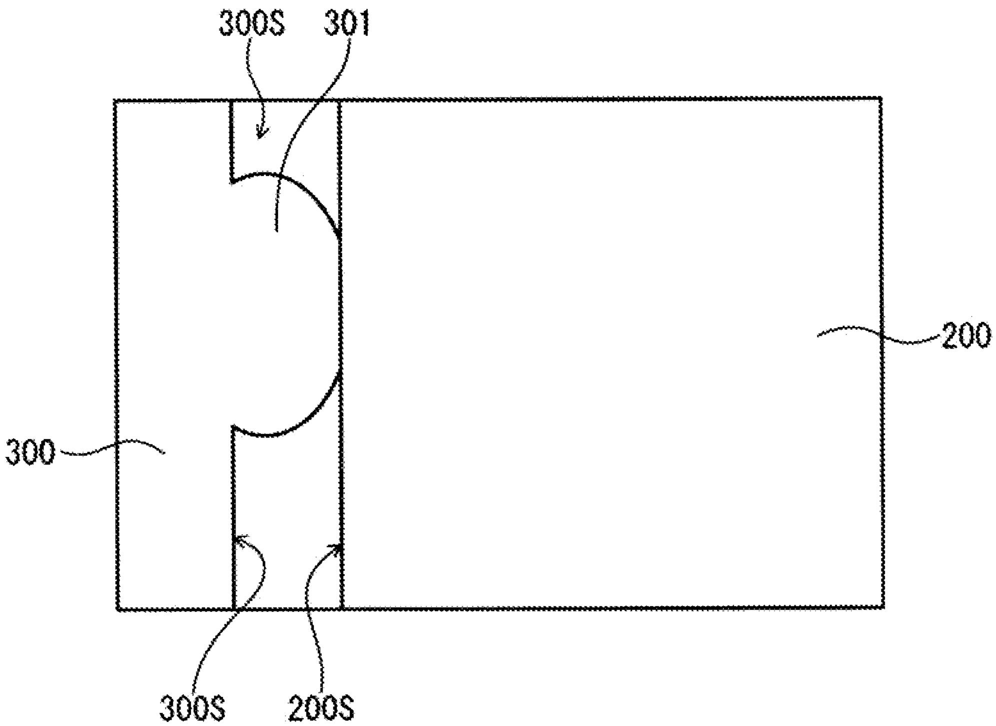
FIG. 6C illustrates a third modified example of the sealing member.
Figure 6D:
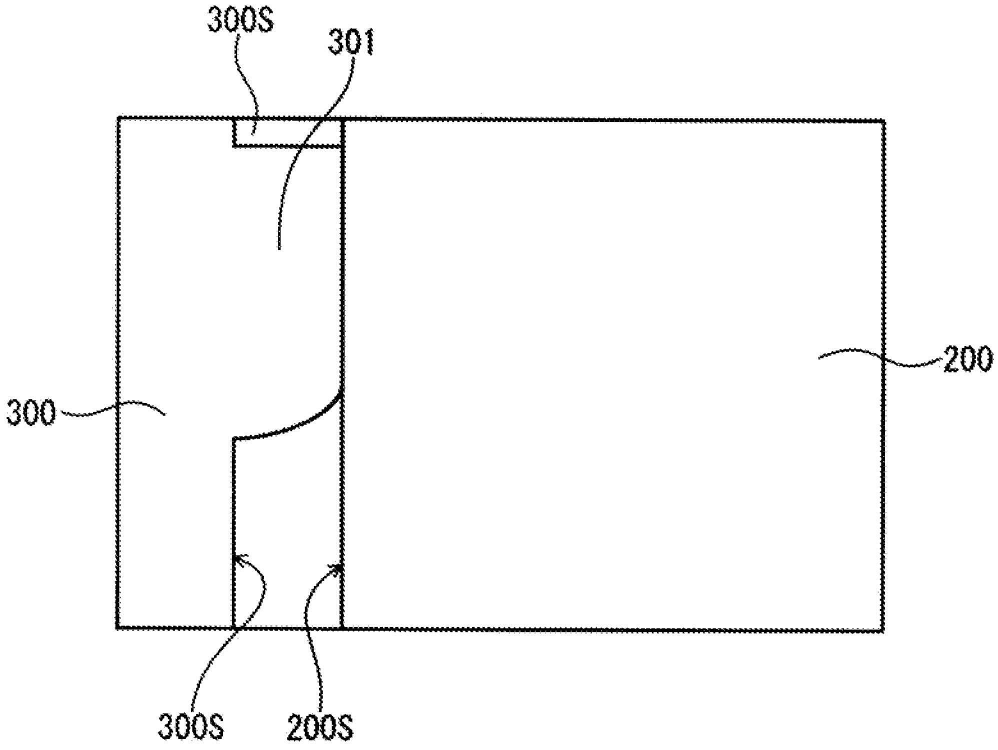
FIG. 6D illustrates a fourth modified example of the sealing member.

FIG. 1 is a perspective view of an electrical storage module in accordance with one exemplary embodiment of the present disclosure. FIG. 2 is a sectional view of the electrical storage device taken on line II-II shown in FIG. 1. FIG. 3A is an enlarged view of a principal part of FIG. 2. FIG. 3B illustrates a state immediately before the electrical storage device has been housed in a housing part in FIG. 3A. FIG. 4 is a perspective view of an example of a holder. FIG. 5A is a plan view of the holder shown in FIG. 4. FIG. 5B is a partial sectional view of the holder taken along line A-A shown in FIG. 4. FIG. 5C is a sectional view of the holder taken along line B-B shown in FIG. 4.

In FIGS. 1 and 2, plural cylindrical electrical storage devices 200 are positioned by holder 300, and arranged such that first end surfaces 201 face the same direction. In FIGS. 1 and 2, cylindrical electrical storage devices 200 are arranged in a staggered manner, but shapes, arrangement, direction, number, and the like, of the electrical storage devices are not particularly limited to.

Holder 300 includes plural housing parts 302 each of which houses corresponding one of the electrical storage devices 200. Each of housing parts 302 has through-hole 302*h* extending in an axial direction of each of the electrical storage devices 200. One electrical storage device 200 is inserted in one through-hole 302*h*.

Each electrical storage device 200 includes outer circumferential surface 200S, first end surface 201 disposed at a first end of outer circumferential surface 200S, and second end surface 202 disposed at a second end of outer circumferential surface 200S. Inner circumferential surface 300S of housing part 302 faces outer circumferential surface 200S of electrical storage device 200. Annular sealing member 301 pressing outer circumferential surface 200S is provided on inner circumferential surface 300S of housing part 302.

The inner diameter of housing part 302 is slightly larger than the outer diameter of electrical storage device 200. That is, air-gap is provided between electrical storage device 200 and holder 300. In the air-gap, in sealing space S demarcated by inner circumferential surface 300S of housing part 302, outer circumferential surface 200S of electrical storage device 200, and sealing member 301, resin member 400 is filled. Electrical storage device 200 is bonded and fixed to holder 300 with resin member 400.

Electrical storage device 200 includes case 210 having outer circumferential surface 200S, electrode body 200G housed in case 210, and sealing member 230 sealing an opening of the case. Case 210 includes tubular portion 211, opening end 212 provided at a first end of tubular portion 211, and bottom portion 213 (see FIG. 2) closing a second end of tubular portion 211. The outer diameter of tubular portion 211 of case 210 is substantially the same as the outer diameter of opening end 212. Annular groove 210G is formed at the boundary between opening end 212 and tubular portion 211.

FIG. 3A shows collector 500 with a plate shape electrically connected to electrical storage devices 200, and insulating plate 600 interposed between collector 500 and end surface 300T of housing part 302 of holder 300. Insulating plate 600 has an opening hole corresponding to first end surface 201. Sealing member 230 includes lead member 231 contacting collector 500 through the opening hole. Lead member 231 is electrically connected to collector 500 by, for example, welding.

As shown in FIG. 3A, the height of holder 300 is slightly larger than the height of electrical storage device 200. In the example shown in the drawing, the height of through-hole 302*h* of housing part 302 is slightly smaller than the height of electrical storage device 200, a peripheral edge of first end surface 201 of electrical storage device 200 slightly protrudes from end surface 300T of housing parts 302. Such a compact structure is achieved because holder 300 does not have a member covering the peripheral edge of first end surface 201 of electrical storage device 200 or a member covering the peripheral edge of second end surface 202. The height of electrical storage module 100 is slightly larger than that of electrical storage device 200, so that the high energy density is easily achieved.

As shown in FIGS. 5B and 5C, the inner diameter of opening 302M at both ends of through-hole 302*h* is the same as the inner diameter of the other part of the through-hole 301*h*. That is, holder 300 does not include a member covering the peripheral edge of first end surface 201 of electrical storage device 200 or a member covering the peripheral edge of second end surface 202. Therefore, electrical storage device 200 having the outer diameter slightly smaller than the inner diameter of through-hole 302*h* can be easily inserted into housing part 302 from opening 302M of through-hole 302*h*. As a result, when the module is viewed from the first end surface 201 in the axial direction (first direction) of electrical storage device 200, the entire peripheral edge of first end surface 201 is exposed from holder 300. When the module is viewed from a second end surface 202 in the first direction, the entire peripheral edge of second end surface 202 is exposed from holder 300.

Sealing member 301 is located in the vicinity of groove portion 210G of case 210, and presses the boundary portion of opening end 212 with respect to groove portion 210G. Thus, sealing space S is demarcated by inner circumferential surface 300S of housing part 302, outer circumferential surfaces 200S of opening end 212 of the electrical storage device, and sealing member 301. Sealing space S has a cylindrical shape opening at the first end surface 201. Resin member 400 fills cylindrical sealing space S extending from sealing member 301 toward first end surface 201.

The cross sectional shape of sealing member 301 on a plane passing through the central axis of housing parts 302 is not particularly limited to. FIGS. 6A to 6D show holder 300 of first to fourth modified examples, and shows a variety of cross sectional shapes of sealing member 301. Sealing member 301 protruding from inner circumferential surface 300S of holder 300 contacts outer circumferential surface 200S of electrical storage device 200, and sealing space S is demarcated by inner circumferential surface 300S, outer circumferential surfaces 200S, and sealing member 301. The cross sectional shape of sealing member 301 is not limited to these drawings.

Figure 7A:
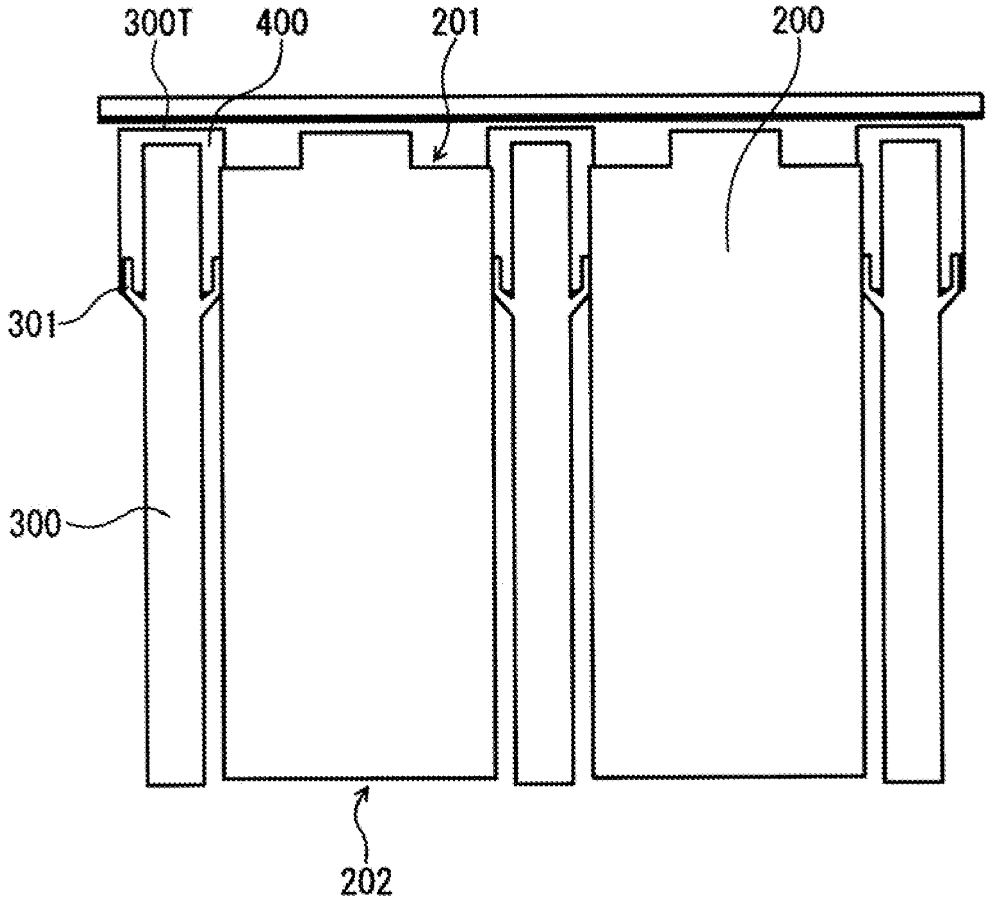
FIG. 7A is a conceptual sectional view of the electrical storage module.

FIG. 7A is a conceptual sectional view showing a configuration of electrical storage module 100. In FIG. 7A, resin member 400 not only remains in sealing space S but also extends from sealing space S to end surface 300T of holder 300 through opening 302M of housing part 302. End surface 300T of holder 300 is covered with resin member 400. In this case, collector 500 and insulating plate 600 may contact end surface 300T of holder 300 via resin member 400. Thus, collector 500 is adhered to the holder.

Figure 7B:
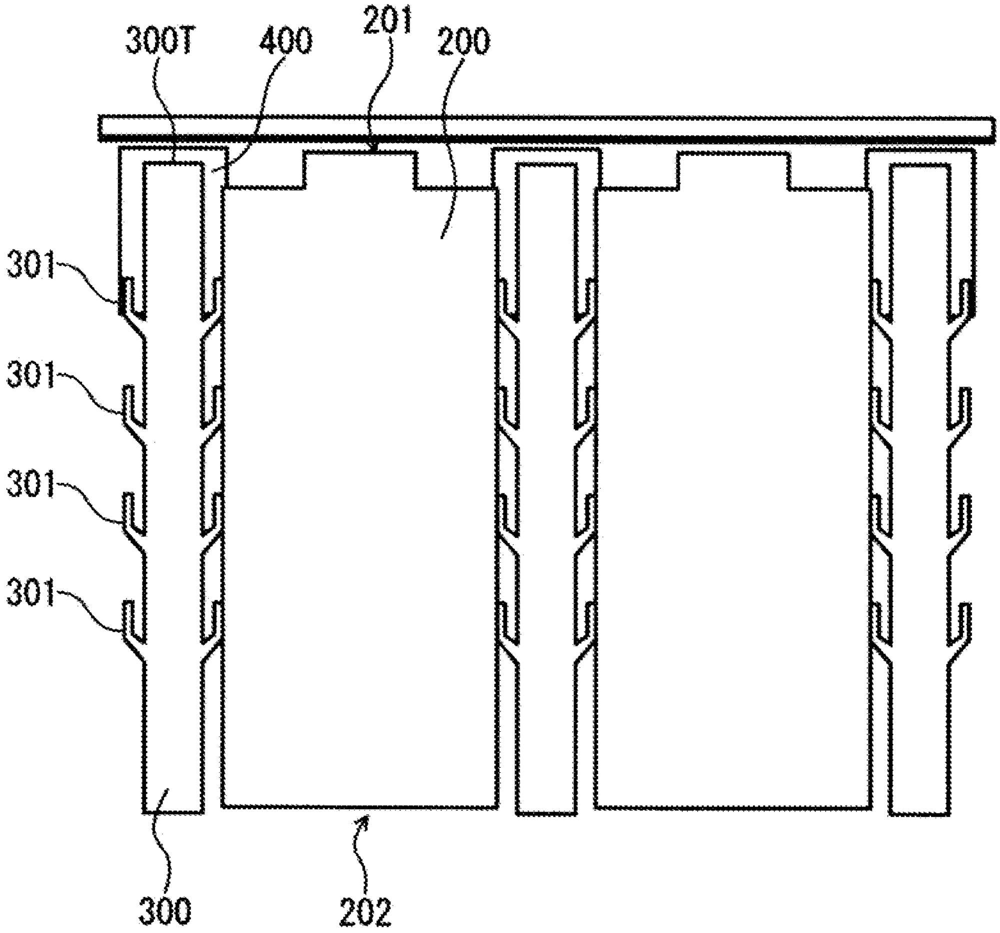
FIG. 7B illustrates a first modified example of the electrical storage module.

FIG. 7B shows a first modified example of electrical storage module 100 shown in FIG. 7A. In the first modified example, plural sealing members 301 are arranged on inner circumferential surface 300S of housing part 302 along the first direction. Herein, four sealing members 301 having the same cross sectional shapes are arranged on inner circumferential surface 300S along the first direction, but it is not necessary for all of the sealing member 301 to have the same sectional shape. Furthermore, the number of sealing members 301 may be less than 4 and may be 5 or more.

Figure 7C:
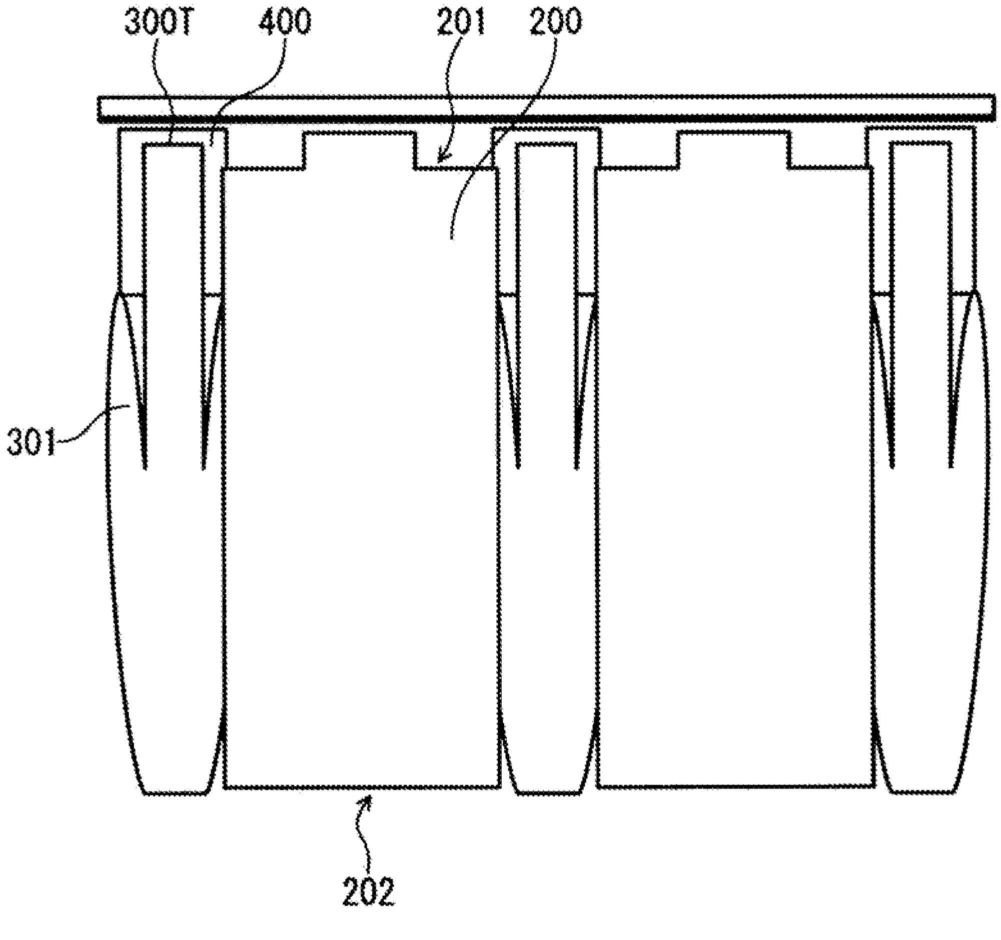
FIG. 7C illustrates a second modified example of the electrical storage module.

FIG. 7C shows a second modified example of electrical storage module 100 shown in FIG. 7A. In the second modified example, seal member 301 has a tubular shape covering a portion of outer circumferential surface 200S of electrical storage device 200. In an unload state before electrical storage device 200 is housed in housing part 302, a thickness of sealing member 301 gradually increases as a direction from first end portion 201 to the middle of second end portion 202, and then gradually decreases from the middle of second end portion 202. Electrical storage device 200 is inserted into housing part 302 from the first end portion 201. The inner diameter of housing part 302 is slightly smaller than the outer diameter of electrical storage device 200 at the second end portion 202, and is slightly larger than the outer diameter of electrical storage device 200 in a position in which sealing member 301 has a maximum thickness.

Figure 8:
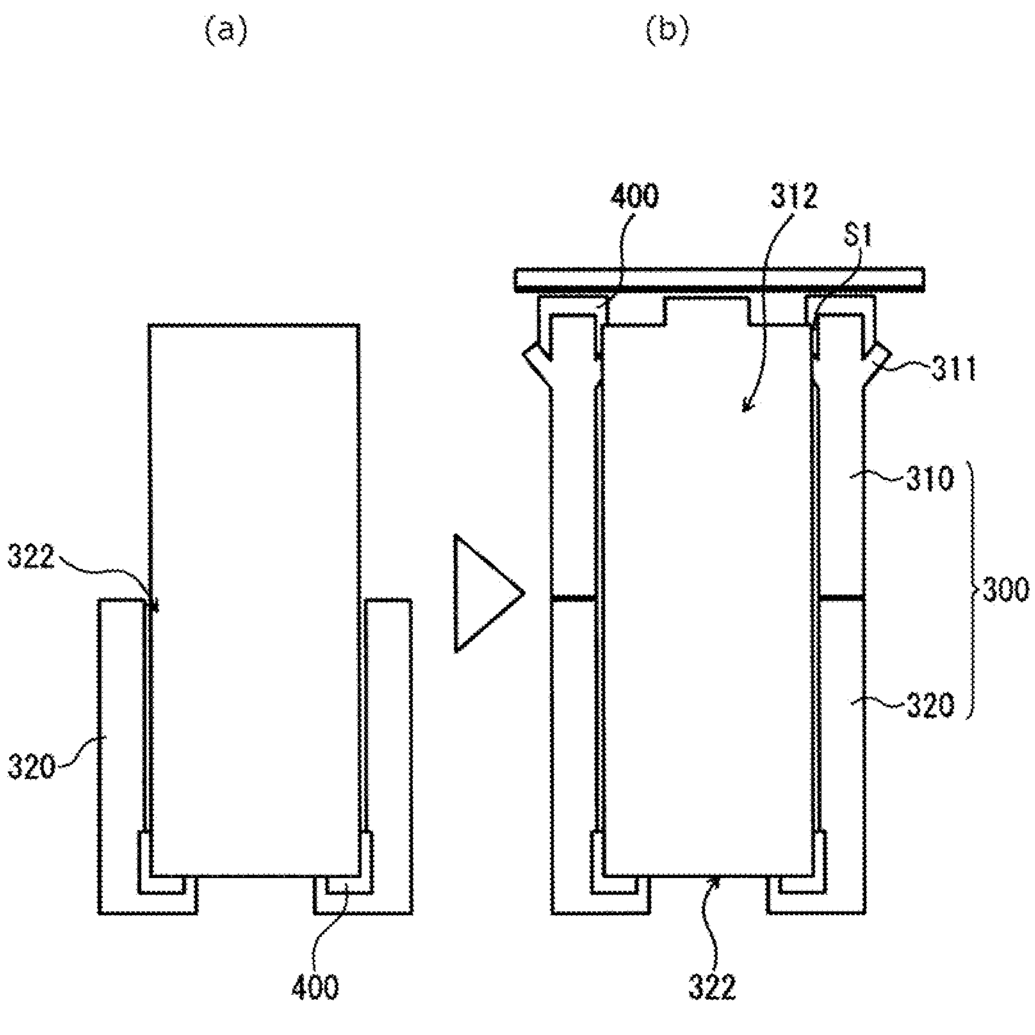
FIG. 8 illustrates a relation between one of a first holder component and a second holder component and an electrical storage device in a third modified example of the electrical storage module in part (a), and illustrates a relation between the other of the first holder component and the second holder component and the electrical storage device in the third modified example in part (b).

FIG. 8 shows a third modified example of the electrical storage module. In the third modified example, holder 300 includes first holder component 310 and second holder component 320 which communicate with each other in the first direction. First holder component 310 includes first housing portion 312 housing a portion of electrical storage device 200 including the first end surface 201. Second holder component 320 includes second housing portion 322 housing a portion of electrical storage device 200 including the second end surface 202.

First sealing member 311 is provided on inner circumferential surface 310S of first housing portion 312. Resin member 400 is housed in first space S1 demarcated by inner circumferential surface 310S of first housing portion 312, outer circumferential surface 200S of electrical storage device 200, and first sealing member 311. First space S1 is a space extending from first sealing member 311 to first end surface 201.

Base portion 323 supporting the peripheral edge of second end surface 202 is provided at the end portion of second housing portion 322 including the second end surface 202. Resin member 400 is disposed between base portion 323 of second holder component 320 and a peripheral edge of second end surface 202 of electrical storage device 200 to bond both portions. Base portion 323 is a member covering the peripheral edge of second end surface 202 of electrical storage device 200. Therefore, the entire peripheral edge of second end surface 202 is covered by base portion 323 when the module is viewed from the second end surface 202 along the first direction. Second holder component 320 having such a structure allows electrical storage device 200 to be fixed with resin member 400 to holder 300 also at the second end surface 202, and enhances strength of electrical storage module 100. Furthermore, second holder component 320 including base portion 323 allows electrical storage module 100 to be manufactured easy.

Since the inner diameter of base portion 323 is smaller than the outer diameter of electrical storage device 200, as shown in FIG. 8(*a*), electrical storage device 200 is inserted into second holder component 320 from first end portion 201. Resin member 400 is disposed previously in base portion 323. Next, as shown in FIG. 8(*b*), a portion of electrical storage device 200 including the first end surface 201 is housed in first housing portion 312 of first holder component 310. After that, resin member 400 fills first space S1 and is cured.

Figure 9:
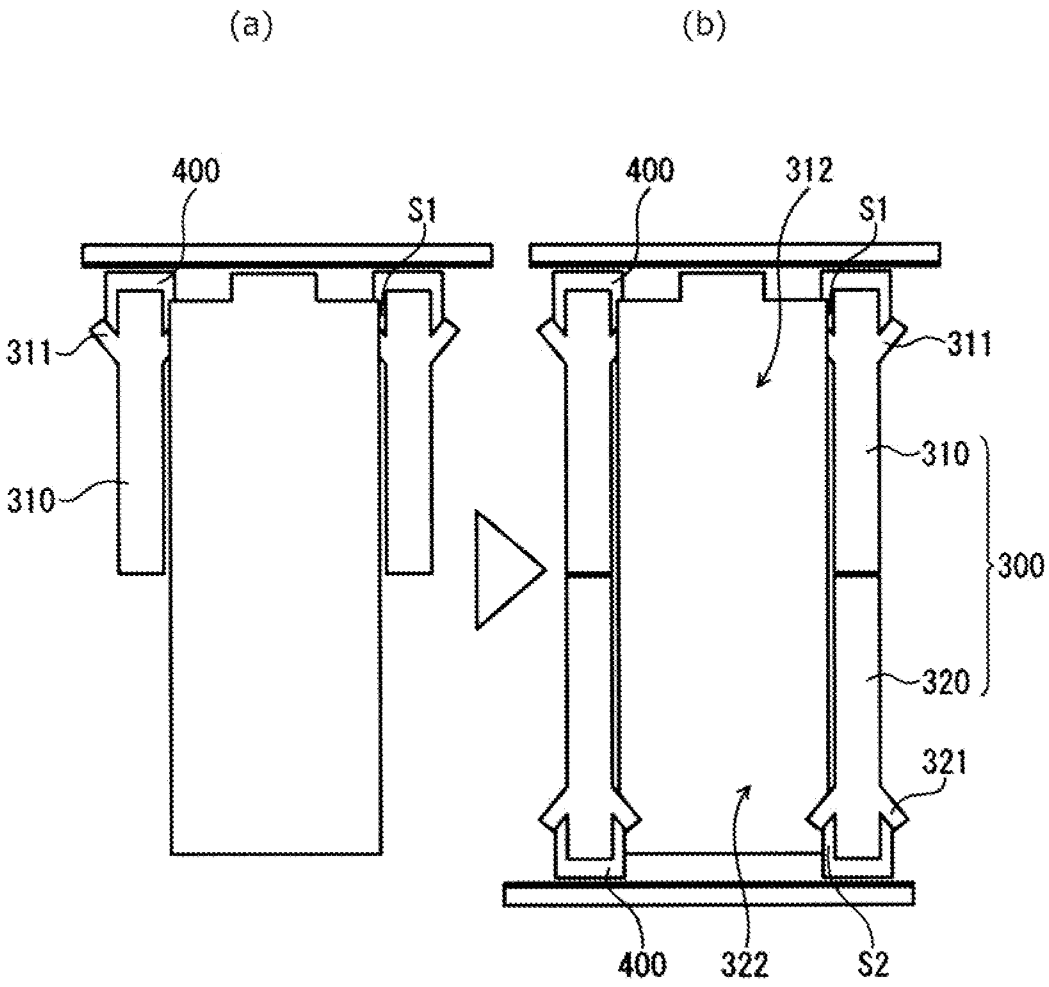
FIG. 9 illustrates a relation between one of a first holder component and a second holder component and an electrical storage device in a fourth modified example of the electrical storage module in part (a), and illustrates a relation between the other of the first holder component and the second holder component and the electrical storage device, in the fourth modified example in part (b).

FIG. 9 shows a fourth modified example of the electrical storage module. In the fourth modified example, holder 300 include first holder component 310 and second holder component 320 which communicate with each other in the first direction. As in the third modified example, first sealing member 311 is provided on inner circumferential surface 310S of first housing portion 312. Resin member 400 is housed in first space S1 demarcated by inner circumferential surface 310S of first housing portion 312, outer circumferential surface 200S of electrical storage device 200, and first sealing member 311. Second sealing member 321 is provided on inner circumferential surface 320S of second housing portion 322. Resin member 400 is housed in second space S2 demarcated by inner circumferential surface 320*s* of second housing portion 322, outer circumferential surface 200S of electrical storage device 200, and second sealing member and 321. Second space S2 is a space extending from second sealing member 321 toward second end surface 202. In this case, structure strength of electrical storage module 100 can be improved.

Electrical storage module 100 in the fourth modified example firstly houses a portion of electrical storage device 200 including the first end surface 201 in first housing portion 312 of first holder component 310. Next, first end surface 201 is disposed at the upper side in the vertical direction, and second end surface 202 is disposed at the lower side in the vertical direction, and resin member 400 fills first space S1 and is cured.

After that, a portion of electrical storage device 200 including the second end surface 202 is housed in second housing portion 322 of second holder component 320. Furthermore, the direction of electrical storage device 200 is reversed, second end surface 202 is disposed at the upper side in the vertical direction, and first end surface 201 is disposed at the lower side in the vertical direction. Then, resin member 400 fills second space S2 and is cured. In this case, second space S2 is a space extending from second sealing member 321 toward second end surface 202.

Figure 10:
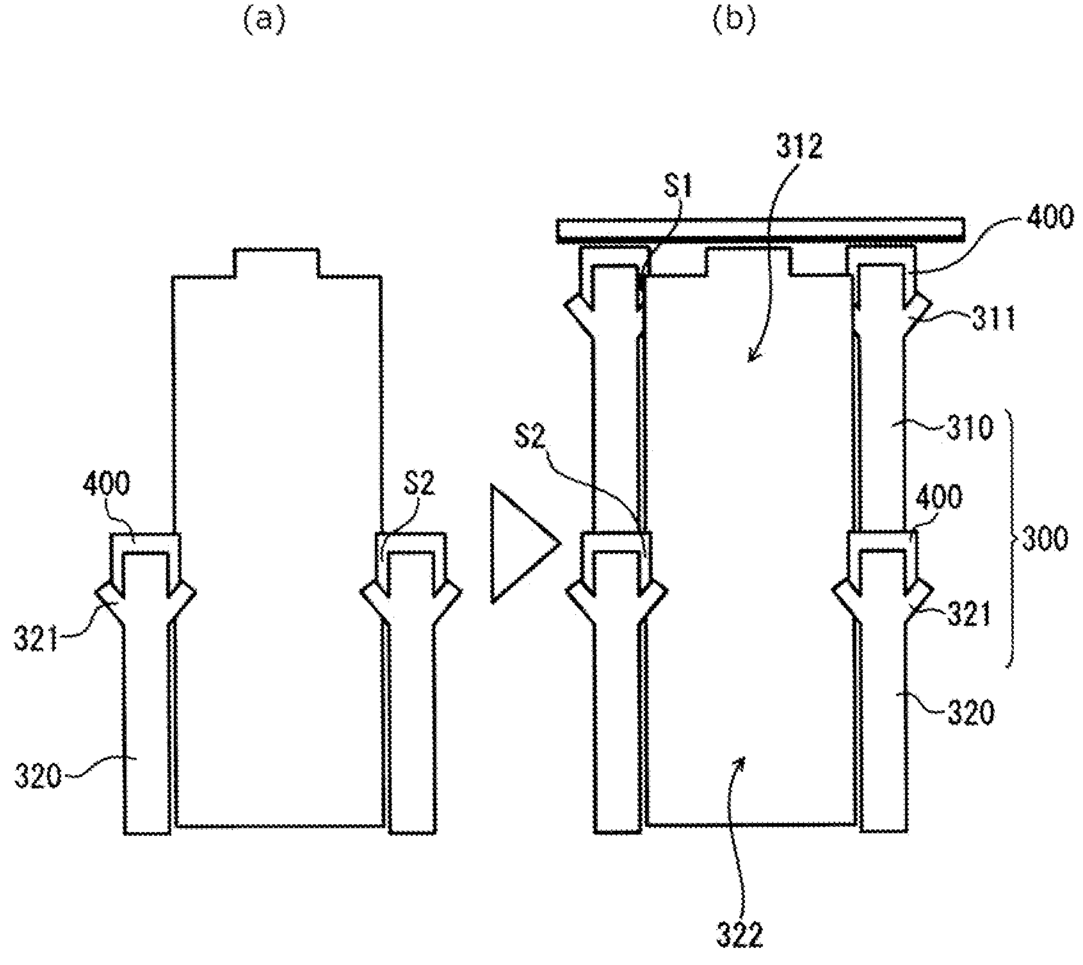
FIG. 10 illustrates a relation between one of a first holder component and a second holder component and an electrical storage device in a fifth modified example of the electrical storage module in part (a), and illustrates a relation between the other of the first holder component and the second holder component and the electrical storage device in the fifth modified example in part (b).

FIG. 10 shows a fifth modified example of the electrical storage module. Also in the fifth modified example, holder 300 includes first holder component 310 and second holder component 320 which communicate with each other in the first direction. As in the third modified example, first space S1 is demarcated, and resin member 400 is housed in first space S1. Furthermore, second space S2 is demarcated, and resin member 400 is housed in second space S2.

However, second space S2 is a space extending from second sealing member 321 toward first end surface 201. In this case, firstly, a portion of electrical storage device 200 including second end surface 202 is housed in second housing portion 322 of second holder component 320, first end surface 201 is disposed at the upper side in the vertical direction, second end surface 202 is disposed at the lower side in the vertical direction, and resin member fills second space S2 and is cured. After that, a portion of electrical storage device 200 including first end surface 201 is housed in first housing portion 312 of first holder component 310, first end surface 201 is disposed at the upper side in the vertical direction, and second end surface 202 is disposed at the lower side in the vertical direction. Then, resin member 400 fills first space S1 and is cured.

In the above, a cylindrical electrical storage device is described as an example, but the present disclosure can be applicable in electrical storage devices having various shapes (for example, rectangular).

INDUSTRIAL APPLICABILITY

An electrical storage module according to the present disclosure is applicable to various electrical storage devices, in particular, the electrical storage module is suitably used for power sources of vehicles, for example, hybrid vehicles, electric vehicles, and the like.

REFERENCE MARKS IN THE DRAWINGS

100 electrical storage module
200 electrical storage device
200S outer circumferential surface
200G electrode body
201 first end surface
202 second end surface
210 case
210G groove portion
211 tubular portion
212 opening end
213 bottom portion
230 sealing member
300 holder
300S inner circumferential surface
300T end surface
301 sealing member
302 housing part
302*h* through-hole
302M opening
310 first holder component
311 first sealing member
312 first housing portion
320 second holder component
321 second sealing member
322 second housing portion
400 resin member

The invention claimed is:

1. An electrical storage module comprising:

a plurality of electrical storage devices;

a holder including a plurality of housing parts, each of the plurality of housing parts housing a corresponding one of the plurality of electrical storage devices therein, a first resin member, wherein the corresponding one of the plurality of electrical storage devices has an outer circumferential surface, a first end surface which is provided at a first end of the outer circumferential surface, and a second end surface which is provided at a second end of the outer circumferential surface and is opposite to the first end in a first direction, each of the plurality of housing parts has an inner circumferential surface which faces the outer circumferential surface of the corresponding one of the plurality of electrical storage devices, and the inner circumferential surface includes a first sealing member protruding from the inner circumferential surface in a second direction crossing the first direction, a top of the first sealing member pressing the outer circumferential surface, the top of the first sealing member being disposed between and spaced apart from both ends of the inner circumferential surface in the first direction, the inner circumferential surface includes a cylindrical portion having a constant diameter along the first direction, the top of the first sealing member faces only the cylindrical portion of the inner circumferential surface, and the first resin member is housed in a first space demarcated by the inner circumferential surface of each of the plurality of housing parts, the outer circumferential surface of the corresponding one of the plurality of electrical storage devices, and the first sealing member.

2. The electrical storage module according to claim 1, wherein each of the plurality of housing parts of the holder has a through-hole provided therein, the through-hole extending in the first direction.

3. The electrical storage module according to claim 1, wherein at least a portion of a peripheral edge of the first end surface is exposed from the holder when the electrical storage module is viewed from the first end surface in the first direction.

4. The electrical storage module according to claim 1, wherein at least a portion of a peripheral edge of the second end surface is exposed from the holder when the electrical storage module is viewed from the second end surface in the first direction.

5. The electrical storage module according to claim 1, wherein the first sealing member comprises a plurality of first sealing members provided which are provided on the inner circumferential surface of the holder and are arranged along the first direction.

6. The electrical storage module according to claim 1, wherein the first sealing member has a tubular shape covering a portion of the outer circumferential surface therein.

7. The electrical storage module according to claim 1, wherein the holder includes a first holder component and a second holder component communicating with each other in the first direction, the first holder component includes a first housing portion housing a portion of the corresponding one of the plurality of electrical storage devices including the first end surface, the second holder component includes a second housing portion housing a portion of the corresponding one of the plurality of electrical storage devices including the second end surface, the first sealing member is provided on a first portion of the inner circumferential surface assigned to the first housing portion, and the resin member is housed in the first space demarcated by the first portion of the inner circumferential surface assigned to the first housing portion, the outer circumferential surface of the corresponding one of the plurality of electrical storage devices, and the first sealing member.

8. The electrical storage module according to claim 7, further comprising a second resin member, wherein, the holder further includes a second sealing member provided on a second portion of the inner circumferential surface assigned to the second housing portion, and the second resin member is housed in a second space demarcated by the second portion of the inner circumferential surface assigned to the second housing portion, the outer circumferential surface of the corresponding one of the plurality of electrical storage devices, and the second sealing member.

9. The electrical storage module according to claim 8, wherein the second space extends from the second sealing member toward the second end surface.

10. The electrical storage module according to claim 8, wherein the second space extends from the second sealing member toward the first end surface.

11. The electrical storage module according to claim 1, further comprising a collector electrically connecting the plurality of electrical storage devices to one another, wherein an opening of each of the plurality of housing parts is provided at an end surface of the holder, the first resin member extends from the space to an end surface of the holder through the opening of each of the plurality of housing parts, and the collector contacts the end surface of the holder via the first resin member.

12. The electrical storage module according to claim 1, wherein the corresponding one of the plurality of electrical storage devices includes a case having an opening, an electrode body housed in the case and including a first electrode and a second electrode, and a sealing member sealing the opening of the case, and the case includes a tubular portion, an opening end provided at the opening at the one end of the tubular portion, and a bottom portion closing a second end of the tubular portion, the first end surface includes an outer surface of the sealing member, and the second end surface includes an outer surface of the bottom portion.

13. The electrical storage module according to claim 1, wherein a tip of a protruding end of the first sealing member is positioned between two ends of each of the plurality of housing parts in the first direction.

14. The electrical storage module according to claim 1, wherein the first resin member protrudes from the outer circumferential surface of the corresponding one of the plurality of electrical storage devices in the first direction.

15. The electrical storage module according to claim 1, wherein the electrical storage module includes a third space located on a side opposite to the first space across the first sealing member in the first direction, and the third space is demarcated by the inner circumferential surface of each of the plurality of housing parts, the outer circumferential surface of the corresponding one of the plurality of electrical storage devices, and the first sealing member.

16. The electrical storage module according to claim 1, wherein the second direction is perpendicular to the first direction.

17. The electrical storage module according to claim 1, wherein each of the plurality of housing parts further has an end surface connected to the inner circumferential surface, and the first resin member is provided continuously on the inner circumferential surface and the end surface.

18. The electrical storage module according to claim 1, wherein another one of the plurality of housing parts houses another corresponding one of the plurality of electrical storage devices therein, the holder includes a portion located between the corresponding one of the plurality of electrical storage devices and the another corresponding one of the plurality of electrical storage devices, the portion of the holder has the inner circumferential surface of each of the plurality of housing parts, an end surface connected to the inner circumferential surface, and another inner circumferential surface which is connected to the end surface and which faces the another corresponding one of the plurality of electrical storage devices, the first resin member is housed in the first space and another space demarcated at least by the another inner circumferential surface of the another one of the plurality of housing parts and the another corresponding one of the plurality of electrical storage devices such that the first resin member is provided continuously on the inner circumferential surface, the end surface and the another inner circumferential surface.

19. The electrical storage module according to claim 1, wherein an angle formed between a third direction perpendicular to a direction in which the top of the first sealing member protrudes from the inner circumferential surface and the first direction is smaller than an angle formed between the third direction and the second direction.

20. The electrical storage module according to claim 1, wherein an angle formed between a fourth direction in which the top of the first sealing member protrudes from the inner circumferential surface and the second direction is smaller than an angle formed between the fourth direction and the first direction.

* * * * *